United States Patent [19]

Boushek, Jr.

[11] 4,159,749  
[45] Jul. 3, 1979

[54] HARVESTING MACHINE FRAME

[75] Inventor: Sidney J. Boushek, Jr., Ottumwa, Iowa

[73] Assignee: Deere & Company, Moline, Ill.

[21] Appl. No.: 846,377

[22] Filed: Oct. 28, 1977

[51] Int. Cl.$^2$ .................. B62D 21/00; A01D 67/00
[52] U.S. Cl. .................................. 180/305; 56/209; 180/900; 180/89.1; 280/111; 280/781; 296/204
[58] Field of Search ............... 180/1 F, 6.48, 25 R, 180/27, 66 B, 89.1; 56/209; 280/111, 781; 296/28 R, 106 R

[56] References Cited

U.S. PATENT DOCUMENTS

| | | | |
|---|---|---|---|
| 3,154,164 | 10/1964 | Shaw et al. | 280/111 X |
| 3,165,162 | 1/1965 | Ganguet | 180/27 |
| 3,336,735 | 8/1967 | Schoenwald | 180/25 R X |
| 3,459,273 | 8/1969 | Leinhauser et al. | 180/6.48 |
| 3,474,607 | 10/1969 | Fairbank | 56/209 |
| 3,543,872 | 12/1970 | Halls | 180/27 |
| 3,563,109 | 2/1971 | Glass et al. | 180/6.48 X |
| 3,897,840 | 8/1975 | Molzahn | 180/6.48 |

Primary Examiner—Joseph F. Peters, Jr.
Assistant Examiner—Donn McGiehan

[57] ABSTRACT

A self-propelled windrower has a traction unit that includes a generally horizontal subframe in the form of a regular trapezoid, the subframe including transverse front and rear beams and a pair of rearwardly converging side beams connecting the opposite ends of the front and rear beams. The rear beam has a central fore and aft pivot, which carries an oscillating rear axle structure that includes a pair of caster wheels at opposite ends of the axle structure. A pair of drive wheel support housings extend downwardly and forwardly from the opposite ends of the front beam, each housing including a vertical plate that forms the outer housing side wall, the upper end of the plate abutting and being welded to the end of the front beam and also overlapping and being welded to the outer side of the forward end of the side beam. The inner vertical wall of the housing is welded to the under side of the beam a short distance from the end of the beam. A hydrostatic wheel drive motor is rigidly attached to the lower end of each wheel support housing, the respective wheel motors being directly connected to the front drive wheels for the windrower. A harvesting header is supported forwardly of the frame for vertical adjustment relative thereto by means of a pair of vertically swingable fore and aft links respectively pivotally connected to the opposite wheel support housings on transverse pivots mounted on the forward sides of the housing adjacent the upper and lower ends thereof.

10 Claims, 5 Drawing Figures

HARVESTING MACHINE FRAME

BACKGROUND OF THE INVENTION

This invention relates to a self-propelled harvesting machine and more particularly to an improved frame for the traction unit of a self-propelled windrower or the like.

A self-propelled windrower conventionally includes a rearward traction unit that carries a forward, transversely elongated harvesting platform, the traction unit having a pair of forward drive wheels and one or more rearward caster wheels, the machine being steered by controlling the relative speeds of the front drive wheels. While originally such machines utilized only a single rear caster wheel and had a generally triangular shape, with the front wheels being driven through belt drives, more recently, especially in the larger, heavier duty machines, the traction unit frames have featured hydrostatically driven front wheels, with a pair of rearward caster wheels in fore and aft alignment with the front drive wheels, the rear caster wheels being mounted on an axle structure that oscillated about a fore and aft axis. An early machine of the above general type is shown in U.S. Pat. Nos. 3,459,273, and 3,474,607, both of which are assigned to the assignee herein. The machine shown in said patent included a generally rectangular frame with generally fore and aft opposite side frame members and a transverse front beam attached to the forward ends of the opposite side frame members and extending laterally outwardly of the side frame members, a pair of wheel support housings extending downwardly from the opposite ends of the front frame member with the wheel housings being spaced outwardly of the side frame members.

In such machine, the header support linkages have conventionally been attached to the wheel support housings. Such machines are operated on relatively rough terrain with the header normally riding on the ground, the forces due to the weight of the header and the engagement of the header with ground irregularities or foreign objects being transmitted to the windrower through the drive wheel support housings.

A later version of a frame for a self-propelled forage harvester traction unit is shown in U.S. Pat. No. 3,897,840. The frame in said machine also features a main transverse front beam with the wheel support housings attached to and extending downwardly from the opposite ends of the front beam and a pair of side frame members having their forward ends connected to the front beam inwardly of the wheel support housings and tapering rearwardly to a rear transverse frame member. To strengthen the connection of the wheel support housings to the generally horizontal subframe of the traction unit, a second transverse beam is provided rearwardly of the first, the second transverse frame member also being welded to the side frame members as well as to the wheel support housings.

SUMMARY OF THE INVENTION

According to the present invention, there is provided an improved windrower traction unit frame that is simple in design and economical to manufacture, while providing a high strength for a given amount of weight. More specifically, the frame includes a horizontal subframe that is generally in the form of an isosceles triangle having a small portion of its apex truncated, or in other words in the form of a regular trapezoid having a relatively long base and a relatively short top.

An important feature of the invention resides in the fact that the side beams or side frame members are attached to the opposite ends of the front beam and are also connected directly to the wheel support housings, that are also connected to the opposite ends of the front beam. The generally triangular shape of the frame resists twisting and parallelograming of the frame to a greater degree than the former generally rectangular designs. Also, the forces exerted by the header on the wheel support housings as well as the force exerted by the drive wheels on said housings is transmitted to the frame not only through the front beam but through the side frame members or beams.

Another important feature of the invention resides not only in its simple and economical construction, but in its symmetrical and uncluttered appearance.

DESCRIPTION OF THE PREFERRED EMBODIMENT

The invention is embodied in a traction unit for a self-propelled windrower that includes a mobile main frame, indicated in its entirety by the numeral 10. As is well known, a windrower traction unit carries a forward, transversely elongated, vertically adjustable harvesting platform that severs a standing crop and converges it for deposit in a windrow as the machine advances across the field.

Figure 4:
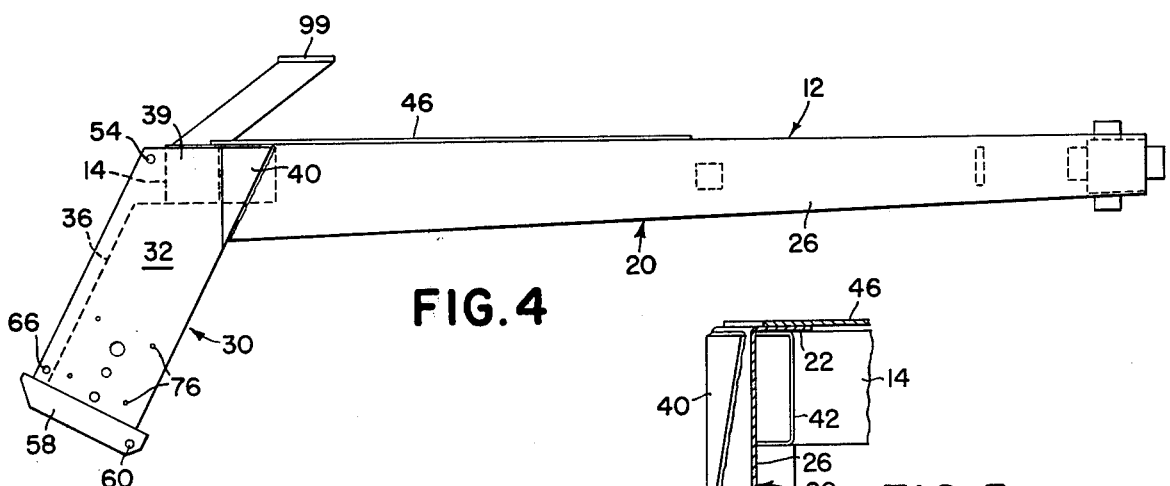
FIG. 4 is a side elevation view of the frame shown in FIG. 3.
Figure 5:
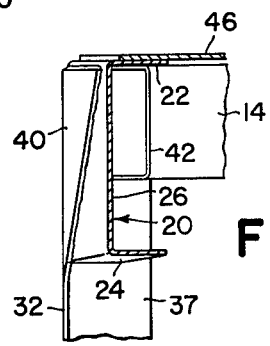
FIG. 5 is an enlarged section showing the connection of the wheel support housing to the front beam and the side beam as viewed along line 5—5 of FIG. 3.

The traction unit frame includes a generally horizontal subframe 12, the subframe being in the form of a regular trapezoid having its base at the forward end of the machine. The frame can also be described as being in the shape of an isosceles triangle with a small portion of the apex of the triangle truncated. The subframe includes a transverse front beam or frame member 14 that is made of conventional steel tubing with a rectangular cross section. A relatively short rear transverse beam 16 is disposed at the rearward end of the subframe, and right and left side beams or channels 18 and 20 respectively interconnect the opposite ends of the front and rear beams 14 and 16 to form the trapezoidal subframe 12. The side beams are mirror images of one another and are channel shaped, with the open side being toward the interior of the frame, each side beam including a generally horizontal top element 22, a generally horizontal bottom element 24, and a vertical outer side element 26 that tapers rearwardly as best shown in FIG. 4, the top and side elements converging rearwardly. The forward ends of the side beams butt against the rearward side of the opposite ends of the front beam 14, the top element 22 of the side beam being generally aligned with the top of the front beam and the outer side 26 of each side beam being generally aligned with the end of the beam. The side beams are welded to the front beam along the front abutting edges of the side beams.

Mounted on the opposite ends of the front beam 14 are right and left wheel support housings 28 and 30, the wheel support housings extending downwardly and forwardly from the front beam and also being attached to the forward ends of the respective side beams 18 and 20. Since the two wheel support housings are mirror immages of one another, only the left housing 30 will be described in greater detail. The housing is formed by a vertical generally trapezoidal outer plate 32, that is welded to the open side of a channel shaped member 33. The member 33 that includes a vertical fore and aft inner wall 34 opposite and spaced from the outer plate 32, a downwardly and forwardly inclined front wall 36, and a downwardly and forwardly inclined rear wall 37. The rear edge of the plate 32 is aligned with the rear wall 37, while the front edge of the plate 32 is parallel to and spaced a short distance forwardly from the front wall 36 to form a forwardly extending lip 38 along the front edge of the housing. The upper portion of the outer plate 32 extends above the channel member 33 to form an upper or top extension 39 that abuts the end of the front beam and is welded thereto. Extending rearwardly from the top extension 39 is a rear flap or extension 40 that overlaps the forward end of the side beam 20, the flap 40 being bent inwardly so that it follows the inward inclination of the side beam. As in the past, the rear and top edges of the flap are welded to the outer side 26 of the side beam 20 to rigidly connect the housing to both the end of the front beam 14 and the side beam 20. A channel shaped brace member 42 is also welded to the rearward side of the front beam and the inner side of the side beam 22 to further strengthen the joint.

A pair of generally horizontal deck plates 44 and 46, in the form of right triangles, are mounted on top of the subframe 12 at the opposite front corners thereof, the deck plates having forward transverse edges lying above and connected to the front beam 14 and rearwardly converging hypotenuse edges that are aligned with the outer sides of the side beams and are connected to the top elements 22 of the side beams.

The upper edge of the inner wall 34 of each channel member 33 seats feeds against the underside of the front beam 14 adjacent the end of the beam and is welded thereto. An L-shaped bracket 48 has a vertical leg 50, that abuts the front side of the front beam 14 and extends forwardly therefrom, and a horizontal leg 52, that is welded to the top of that portion of the channel member 33 that extends forwardly from the front beam, the vertical leg 50 serving as an extension of the inner wall 34 and the horizontal leg 52 being welded to both the channel member 33 and the plate to close the top of the housing forwardly of the beam. A transverse upper pivot 54 extends between the vertical leg 50 of the bracket 48 and the front lip 38 on the outer plate 32 and carries a vertically swingable upper link 56.

Welded to the bottom of the channel member 33 is a lower inverted U-shaped member 58 forming a downwardly open fore and aft channel that closes the lower end of the housing. A transverse pivot 60 is supported in the opposite depending portions of the U-shaped member 58, and a fore and aft lower link 62 is vertically adjustably mounted on and extends forwardly from the pivot 60, the forward end of the link 62 being connected to the windrower header, which is not shown. Welded to the top of the member 58 and to the front wall 36 of the channel shaped member 33 is a cylinder support bracket 64 that carries a transverse pivot 66, on which a generally vertical hydraulic cylinder 68 is mounted, the upper or piston end of the cylinder 68 being connected to the forward end of the upper link 56 by means of a transverse pivot 70. A downwardly and forward inclinded tension spring 72 has one end connected to the pivot 70 and its other end connected to the lower link 62. A similar connection is provided between the right wheel support housing 28 and the header.

A wheel motor 74 is mounted on the outer side of each wheel support housing 28 and 30 by means of conventional fasteners through wheel mounting holes 76 in the outer plates 32 of the support housings. The wheel motors 74 drive output shafts 78 that are directly connected to front drive wheels 80 of the windrower, such high torque, low speed, hydrostatic drive wheel motors being of known construction. As is apparent, the wheel motors are attached to the lower ends of the wheel support housings 28 and 30, and the inner walls 34 of the housings are provided with openings 81 along their lower ends to provide an entrance for the usual hydrostatic plumbing (not shown) for the wheel motors, a cover bracket 82 being provided over each opening to protect the hydraulic plumbing and controls.

Mounted centrally in the rear beam 16 is a fore and aft pivot socket 83 in which an oscillating rear axle structure 84 is pivotally mounted. The rear axle structure includes a transverse beam 86 having a fore and aft pivot shaft 88 mounted in the pivot socket 83 and a pair of caster wheels 90 mounted at opposite ends of the beam by means of vertical pivots 92 in the known manner.

Figure 1:
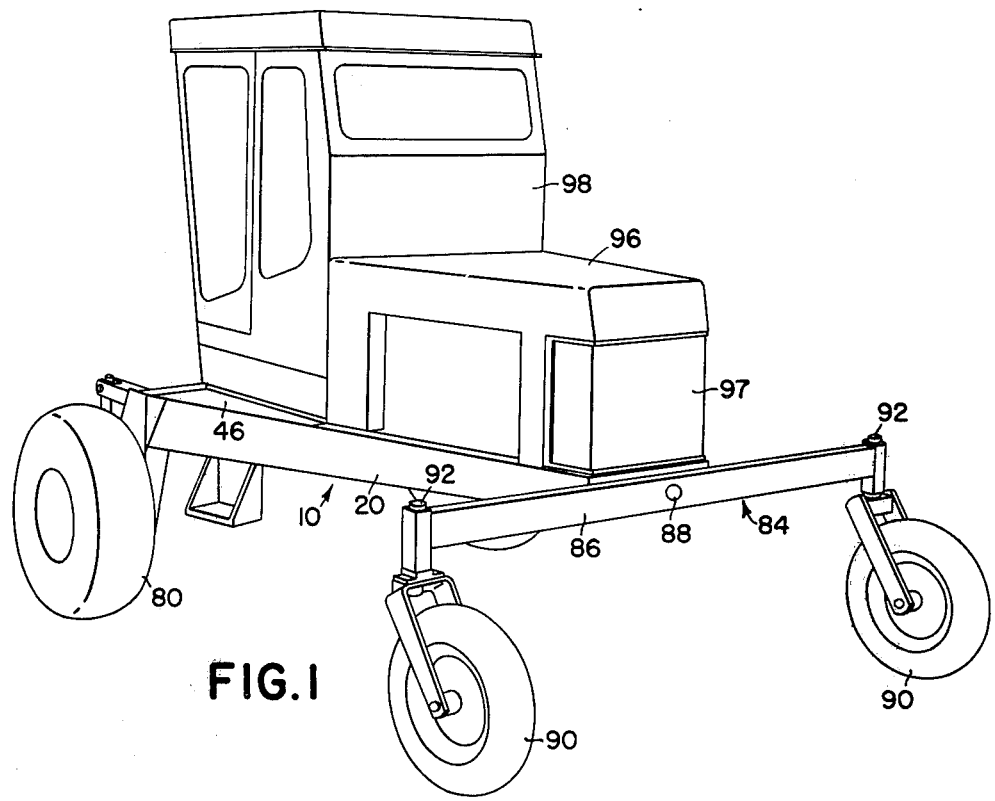
FIG. 1 is a left rear perspective of a windrower traction unit embodying the improved frame design.
Figure 2:
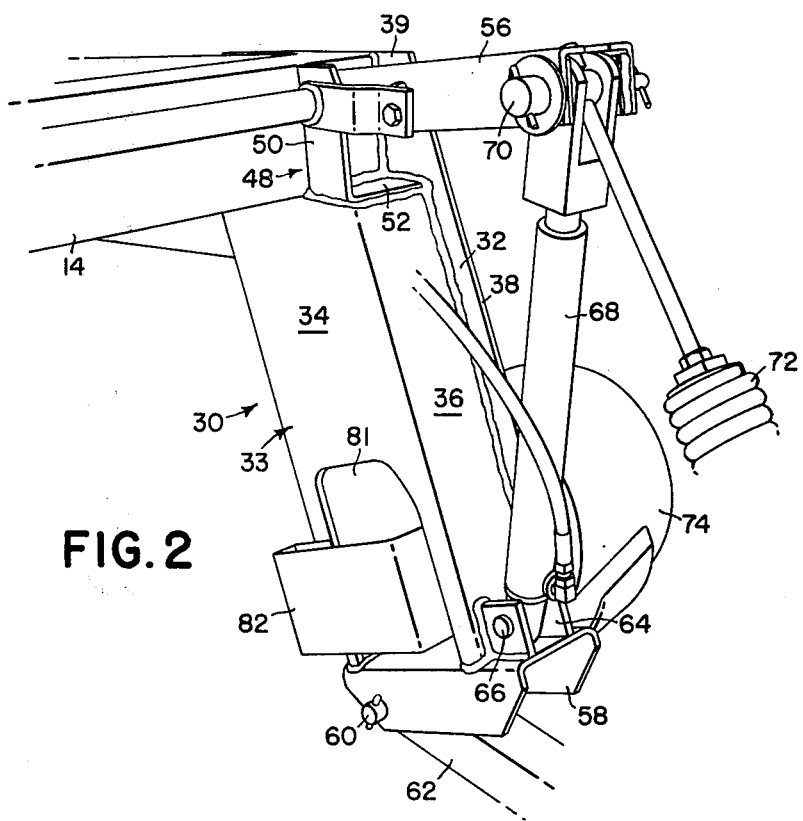
FIG. 2 is a perspective view of one of the frame's wheel support housings showing the connection of the housing to the rest of the frame.
Figure 3:
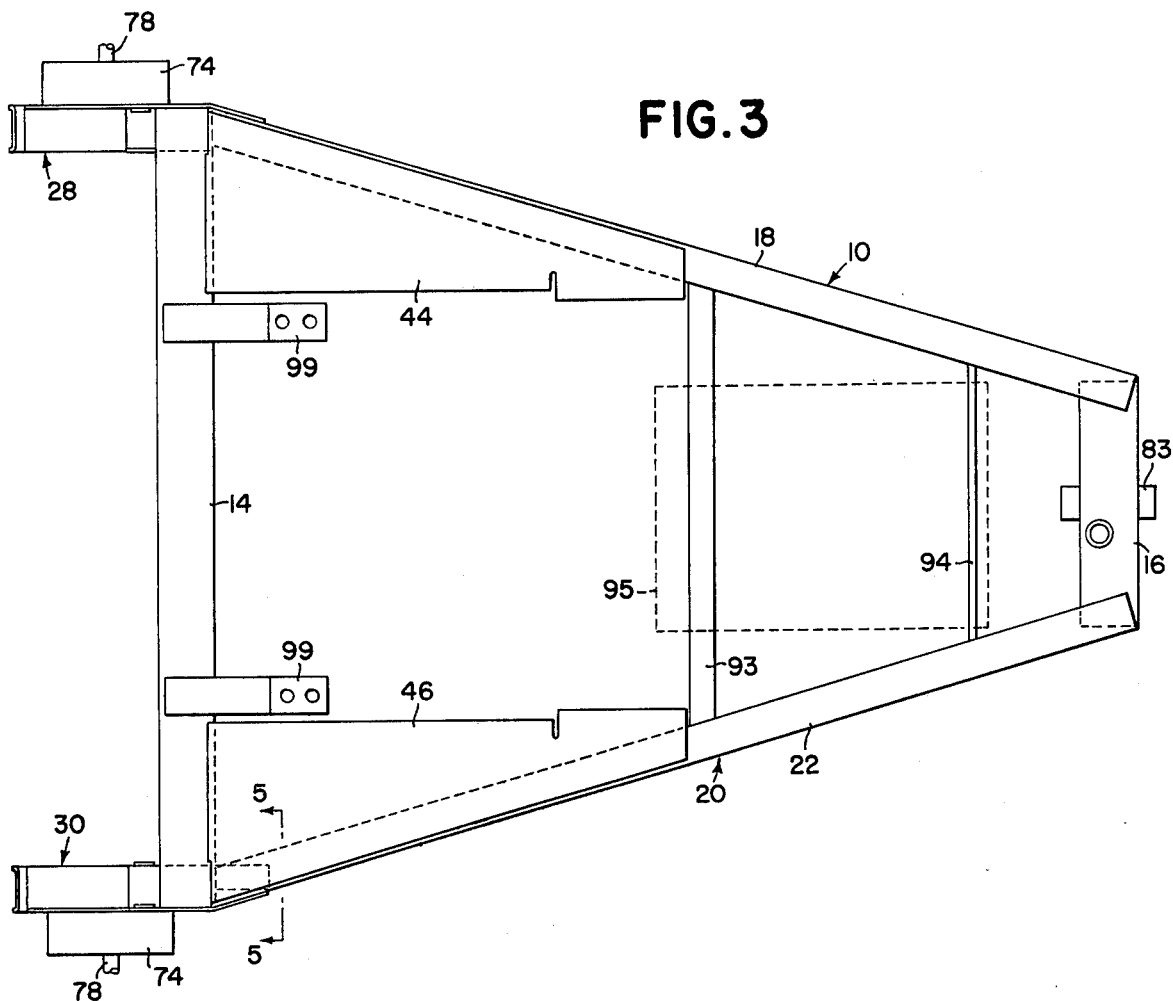
FIG. 3 is a plan view of the improved frame.

Extending between the opposite side beams 18 and 20 are a pair of transverse engine support members 93 and 94, the front support member being approximately half way back on the frame and the rear support member being disposed between the front member 93 and the rear frame beam 16. An internal combustion engine 95, which is shown in outline only in FIG. 3, is supported on the engine support members 93 and 94 and has a fore and aft output shaft that drives the hydrostatic pumps for the respective wheel motors in a known manner. The engine is mounted in an engine enclosure 96 and has an associated radiator 97 at the rear of the machine. Mounted forwardly of the engine enclosure 96 is an operator's station or cab 98 that is mounted on a pair of cab mounting elements 99 extending rearwardly from the front beam 14. The opposite sides of the cab 98 extend upwardly from the inner edges of the deck plates 44 and 46, while the rear wall of the cab extends upwardly from the front of the engine enclosure.

As is apparent, the connection of the wheel support housings directly to the opposite ends of the front beam 14 and to the forward ends of the side beams 18 and 20 provides a relatively simple frame, wherein the generally triangular shape of the subframe 12 resists the twisting and parallelogramming of the frame, while the forces due to the weights and impacts on the header as well as the forces from the drive wheels 80 are transmitted to the frame through both the front beam 14 and the side beams 18 and 22. The multiple welding points between the housings 28 and 30 and the front and side beams provides a very strong and rigid joint despite its simplicity.

I claim:

1. An improved frame for a self-propelled harvesting machine comprising:

a horizontal transverse front beam having opposite ends;

a horizontal transverse rear beam disposed at substantially the same level as the front beam and having opposite ends substantially inwardly of the respective opposite ends of the front beam;

a pair of opposite, generally horizontal side beams having their forward ends respectively attached to the opposite ends of the front beam and their rearward ends respectively attached to the opposite ends of the rear beam, the side beams converging rearwardly at substantially the same angle from the front beam, said beams forming a horizontal subframe in the shape of a regular trapezoid;

a central fore and aft pivot means mounted in the rear beam;

a transverse rear axle structure swingably mounted on said pivot means and having a pair of castering wheels at the opposite ends;

a pair of front wheel support housings respectively directly attached to and extending downwardly from the opposite ends of the front beam and the forward portions of the adjacent side beams;

and a pair of forward drive wheel means respectively supported on the respective housings.

2. The invention defined in claim 1 wherein each wheel support housing includes a vertical plate on the outer lateral side of the housing, an upper portion of each plate abutting and being attached to the end of the front beam and overlapping and being attached to a forward portion of the outer lateral side of the adjacent side beam.

3. The invention defined in claim 2 and including a pair of axially transverse pivot means respectively mounted on the upper and lower ends of each wheel support housing, and a pair of header support links respectively swingably mounted on and extending forwardly from each pair of pivot means.

4. The invention defined in claim 3 wherein each drive wheel means includes a hydraulic drive motor mounted on the lower end of the housing and having an outwardly extending output shaft and a wheel directly connected to the output shaft.

5. The invention defined in claim 4 wherein the frame includes a pair of transverse engine support members extending between the opposite side beams forwardly of the rear beam.

6. The invention defined in claim 5 where each side beam is channel shaped and has a tapered outer wall and rearwardly converging top and bottom walls.

7. The invention defined in claim 3 wherein each wheel support housing includes an inner wall opposite and spaced from the vertical plate, the upper end of the inner wall abutting and being welded to the underside of the front beam.

8. The invention defined in claim 3 and including an operator's station mounted on the front beam centrally of the frame and including a pair of generally right triangular deck plates respectively mounted on top of the front and side plates on opposite sides of the operation station, the hypotenuse of each deck plate extending along the top of the adjacent side beam.

9. An improved frame for a self-propelled machine comprising:

a horizontal transverse front beam having opposite ends;

a pair of opposite generally horizontal side beams having their forward ends respectively attached to the opposite ends of the front beam and converging rearwardly therefrom:

means connecting the rearward ends of the side beams to form a generally triangular horizontal subframe in the form of a regular trapezoid;

a castering rear wheel means supporting the rearward end of the subframe;

a pair of front wheel support housings respectively directly attached to and extending downwardly from the opposite ends of the front beam and the forward portions of the adjacent side beams, each support housing including an outer side wall, an upper portion of the side wall abutting and being welded to the front beam and overlapping and being welded to a forward portion of the outer lateral side of the adjacent side beam, and an inner generally vertical side wall opposite the outer side wall, the upper end of the inner wall abutting and being welded to the under side of the front beam;

and a pair of forward drive wheel means respectively supported on the lower ends of the wheel support housings.

10. The invention defined in claim 9 and including an operator station mounted on the front beam generally centrally thereof, and wherein the frame includes a pair of generally right triangular deck plates with their front edges abutting and being attached to the front beam and their outer hypotenuse edges respectively attached to the top of the side beams.

* * * * *